(12) United States Patent
Yanase et al.

(10) Patent No.: US 6,318,487 B2
(45) Date of Patent: Nov. 20, 2001

(54) REGENERATION CONTROL DEVICE OF HYBRID ELECTRIC VEHICLE

(75) Inventors: Takashi Yanase, Kanagawa; Yuta Susuki, Tokyo, both of (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/790,656

(22) Filed: Feb. 23, 2001

(30) Foreign Application Priority Data

Feb. 24, 2000 (JP) .................................................. 12-047432

(51) Int. Cl.$^7$ ...................................................... B60K 6/04
(52) U.S. Cl. ...................... 180/65.2; 180/65.8; 180/65.4; 318/376; 701/22
(58) Field of Search .................................. 701/22; 318/8, 318/375, 376; 180/65.2, 65.3, 65.4, 65.1, 65.8, 165

(56) References Cited

U.S. PATENT DOCUMENTS

| | | | |
|---|---|---|---|
| 5,176,216 | * 1/1993 | Kawai et al. ........................ | 180/65.2 |
| 5,359,308 | * 10/1994 | Sun ..................................... | 180/65.2 |
| 5,832,396 | * 11/1998 | Moroto et al. ......................... | 701/22 |
| 5,942,879 | * 8/1999 | Ibaraki ................................ | 180/65.2 |
| 5,969,624 | * 10/1999 | Sakai et al. .......................... | 180/65.2 |
| 6,116,368 | * 9/2000 | Lyons et al. ......................... | 180/65.2 |
| 6,177,773 | * 1/2001 | Nakano et al. ....................... | 318/376 |
| 6,209,672 | * 4/2001 | Severinsky .......................... | 180/65.2 |
| 6,223,106 | * 4/2001 | Yano et al. ........................... | 701/22 |

\* cited by examiner

Primary Examiner—Michael Mar

(57) ABSTRACT

A regeneration control device of a hybrid electric vehicle can sufficiently charge a battery with power regenerated as a result of the regenerative braking and effectively perform the regenerative braking, and which can also ease the burden of a friction brake. If chargeable power set by a chargeable power setting device according to an actual level of the battery becomes lower than regenerated power computed by a regenerated power computing unit during the regenerating operation of a motor, the power regenerated by the motor is supplied to a generator. This drives the generator to cause an engine to run an engine brake without the supply of fuel.

8 Claims, 4 Drawing Sheets

REGENERATION CONTROL DEVICE OF HYBRID ELECTRIC VEHICLE

Applicant's hereby claim the right of priority, under 35 U.S.C. §119, based on Japanese Application No. 2000-047432, filed on Feb. 24, 2000, the entire contents of which are hereby incorporated by reference.

BACKGROUND OF THE INVENTION

1. Field of the Invention

The present invention generally relates to a hybrid electric vehicle, and more particularly to a generation control technique for a hybrid electric vehicle.

2. Description of Related Art

In recent years, a series hybrid vehicle equipped with a motor as a source of driving force for the vehicle and charges a secondary battery, which supplies power to the motor, by a generator driven by a relatively-small engine has been developed.

In this series hybrid vehicle, the power (rotational force) from driving wheels runs the motor to generate a braking force when the vehicle is braked. On the other hand, the power generated by the motor is utilized as regeneration energy to enable a so-called regenerative braking. The power acquired by the regenerative braking is normally charged in the battery.

If, however, the power acquired by the regenerative braking is in excess of the maximum charge level of the battery as in the case where the vehicle is suddenly braked, the regenerative braking should not be used to avoid overcharging the battery. It is therefore unavoidable to use a friction brake (service brake), and the use of the friction brake accelerates the wear of a friction material (i.e., brake pads). In order to ease the burden of the friction material, Japanese Patent Provisional Publication No. 7-131905 discloses a device, which supplies the surplus generated power to a generator to operate the generator when the regenerated power acquired by the regenerative braking is in excess of an allowable charge level of the battery, and thereby forcibly runs an engine to run an engine brake by using the power generated by the regenerative braking.

The device disclosed in the above publication operates the generator to obtain engine brake when the generated power exceeds the allowable charge level of the battery.

The battery is not charged until the charge level becomes full regardless of the supplied power if the charged level has not yet reached the full charge. The chargeable power varies according to the charge level of the battery.

Therefore, when the regenerated power exceeds the chargeable power, the battery can only be charged with the chargeable power even if the battery has an extra chargeable capacity in view of its charging level. On the other hand, the braking force in the regenerative braking is not determined for the purpose of charging the battery, but is determined according to a deceleration required by a driver. The regenerated power, which is actually generated by the motor, is directly influenced by a deceleration torque corresponding to the deceleration. The larger the deceleration torque is, the more the regenerated power is.

Therefore, if the generator is operated according to the charge level of the battery to obtain engine brake, it is determined that the battery has an extra chargeable capacity in view of the charge level on condition that the regenerated power is not greater than the allowable charge level of the battery, even when the regenerated power is in excess of the chargeable power when the driver wants to suddenly brake the vehicle. Therefore, the generator is not operated and the engine brake is not obtained. This decreases the power generated by the motor, and increases the number of times at which the friction brake is used. This accelerates the wear of the friction material, and may deteriorate the durability of the friction brake.

SUMMARY OF THE INVENTION

It is therefore an object of the present invention to provide a regeneration control device of a hybrid electric vehicle, which can satisfactorily charge a battery with power generated by regenerative braking and effectively perform the regenerative braking, and which is also able to ease the burden of a friction brake.

The above object can be accomplished by providing a hybrid electric vehicle comprising: a generator activated by a driving force of an engine to thereby generate power; a battery charged by the power generated by the generator; a motor for generating a driving force for a vehicle by the power supplied from the battery and regenerating energy by using power from driving wheels to generate power and charge the battery when the vehicle is being braked; an actual charge level sensing device for sensing an actual charge level of the battery; a chargeable power setting device for setting chargeable power in accordance with a sensed value of the actual charge level sensing device; a deceleration instruction device for instructing the vehicle to decelerate; a deceleration torque sensing device for sensing a deceleration torque required by the deceleration instruction device; a regenerated power computing unit for setting regenerated power to be regenerated by the motor according to a sensed value of the deceleration torque sensing device; and a control device for supplying the power generated by the motor to the generator to thereby drive the generator to run the engine without supply of fuel when chargeable power set by the chargeable power setting device is less than the regenerated power computed by the regenerated power computing unit while the motor is regenerating the energy.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENT

A preferred embodiment of the present invention will be described hereinbelow.

Figure 1:
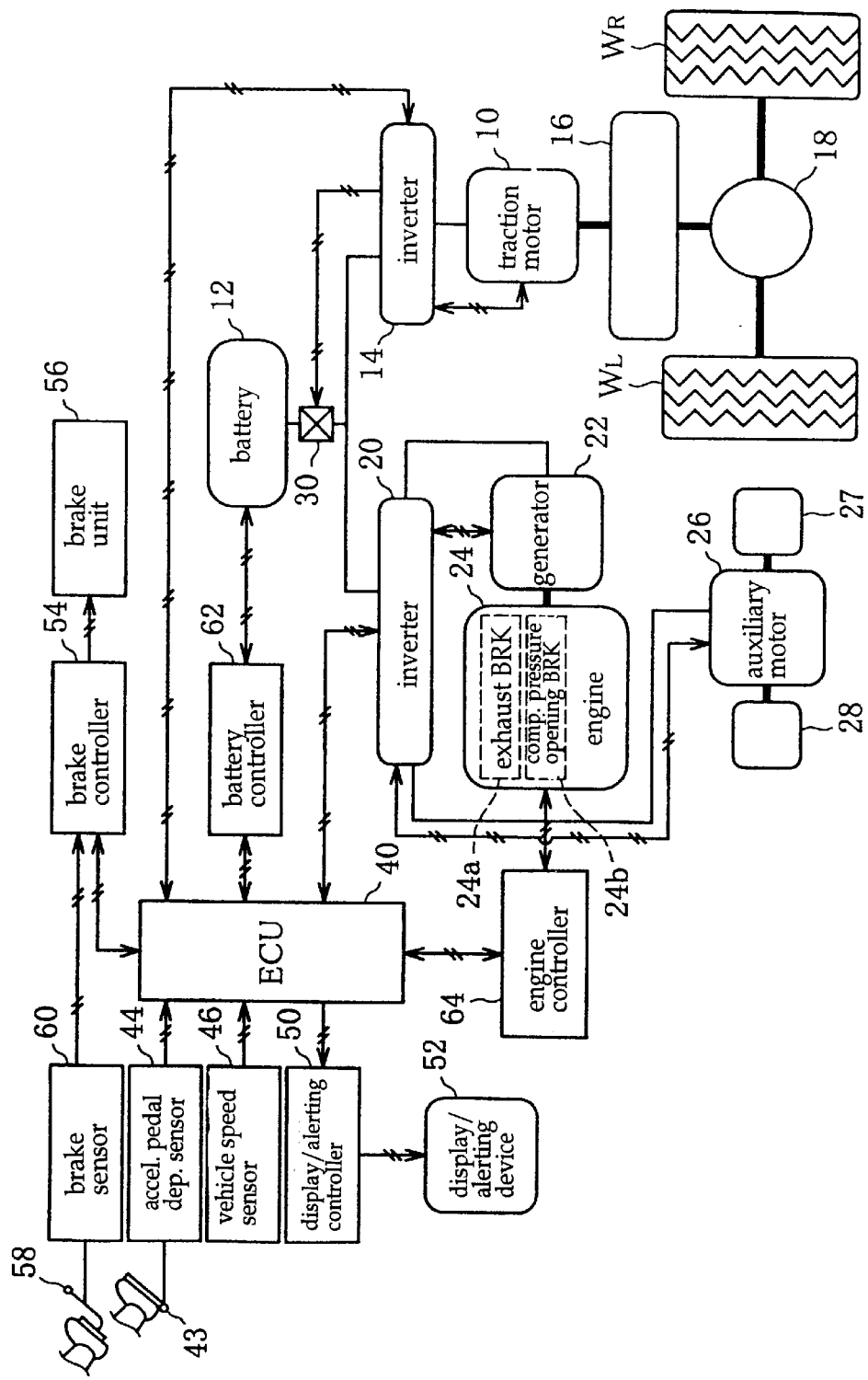
FIG. 1 is a schematic block diagram showing a series hybrid vehicle, to which a regeneration control technique for a hybrid electric vehicle according to the present invention is applied.

FIG. 1 is a schematic block diagram showing a series hybrid vehicle, to which a regeneration control device of a hybrid electric vehicle according to the present invention is applied. With reference to FIG. 1, the structure of the regeneration control device of the hybrid electric vehicle according to the present invention will now be described. For example, a large vehicle such as an omnibus, which runs at a low speed in a city, is supposed to be the series hybrid vehicle.

As shown in FIG. 1, the series hybrid vehicle is equipped with a traction motor 10 as a source of driving force. The traction motor 10 is electrically connected to a high-voltage secondary battery 12 for running the traction motor 10 through an inverter 14. The traction motor 10 is, e.g., an induction motor, but may also be a permanent electromagnet synchronous type motor.

When the vehicle is braked, the traction motor 10 also functions as an energy regenerative brake (for regenerative braking), i.e., a generator that utilizes braking energy. More specifically, when a driver of the vehicle operates a brake pedal 58, the traction motor 10 generates a braking force and electrical power at the same time. The generated power is charged in the battery 12.

The inverter 14 supplies stable power to the traction motor 10 by adjusting voltage and current supplied from the battery 12 or a later-described generator 22, or supplies stable power to the battery 12 by adjusting voltage and current generated by the traction motor 10. As shown in FIG. 1, a pair of driving wheels WR, WL are connected to a rotary shaft of the traction motor 10 through reduction gears 16 and differential gears 18. The reduction gears 16 are not necessarily provided.

The battery 12 and the inverter 14 are electrically connected to the generator 22 through the other inverter 20. A rotary shaft of the generator 22 is connected to an output shaft of an engine 24, which is an internal combustion engine for activating the generator. The engine 24 is an internal combustion engine for exclusive use in generation. If surplus power, which cannot be charged in the battery 12, is generated during the regenerating operation of the traction motor 10, the surplus power drives the generator 22 to forcibly run the engine 24 by rotating the output shaft externally without the supply of fuel so that the surplus power can be consumed as an engine brake.

An exhaust system of the engine 24 has auxiliary braking devices such as an exhaust brake (an exhaust BRK) 24a for generating a braking force by restricting flow of exhaust gasses, and a compression pressure opening type brake (a compression pressure opening BRK) 24b for forcibly opening the air compressed by a piston in a cylinder in order to use a compressing work as a braking force.

The inverter 20 is also electrically connected to an auxiliary motor 26, which drives auxiliary units such as an air compressor 27 for an air brake and a power steering pump 28. As is the case with the inverter 14, the inverter 20 supplies stable power to the battery 12 or the traction motor 10 by adjusting voltage and current generated by the generator 22, or supplies stable power to the auxiliary motor 26 by adjusting voltage and current from the battery 12.

A relay fuse 30 is mounted between the battery 12 and the inverters 14, 20. The relay fuse 30 is electrically connected to the inverter 14. In accordance with information from the inverter 14, the relay fuse 30 allows current to flow from the battery 12 to the traction motor 10, prevents an excessive current from flowing from the battery 12 to the traction motor 10 in accordance with information from the inverter 14, or prevents the generator 22 or traction motor 10 during the regenerative braking (the engine regeneration) from excessively charging the battery 12.

As shown in FIG. 1, the battery 12 and the inverters 14, 20 are electrically connected to an electronic control unit (ECU) 40 so that the battery 12 and the inverter 14, 20 can communicate with the ECU 40. The inverter 14 and the inverter 20 are electrically connected to the traction motor 10 and the generator 22, respectively, so that they can communicate with one another.

The receiving side of the ECU 40 is connected to an accelerator pedal 50, which transmits one output requirement from the driver, i.e., a required motor torque to the traction motor 10. The receiving side of the ECU 40 is also connected to an accelerator pedal depression sensor 44, which senses a control input θacc of the accelerator pedal 43, and a vehicle speed sensor 46, which senses a vehicle speed 46. The vehicle speed sensor 46 is, for example, a vehicle wheel speed sensor that senses vehicle speed V according to vehicle wheel speed information.

On the other hand, the output side of the ECU 40 is connected to a display/alerting device 52 through a display/alerting controller 50. The ECU 40 is also connected to a brake controller 54, which controls the braking of the vehicle by supplying a drive signal to a brake unit (service brake) 56. The brake controller 54 is connected to a brake sensor 60, which senses a control input (e.g., a brake pedal stroke) of the brake pedal 58. The ECU 40 is also connected to a battery controller (actual charge level sensing device) 62, which monitors a charge level (SOC: state of charge), etc. of the battery 12, and an engine controller 64, which controls the operation of the engine 24 and controls the operation of the exhaust brake 24a and the compression pressure opening type brake 24b. The engine controller 64 is capable of sensing an engine revolution speed.

Figure 2:
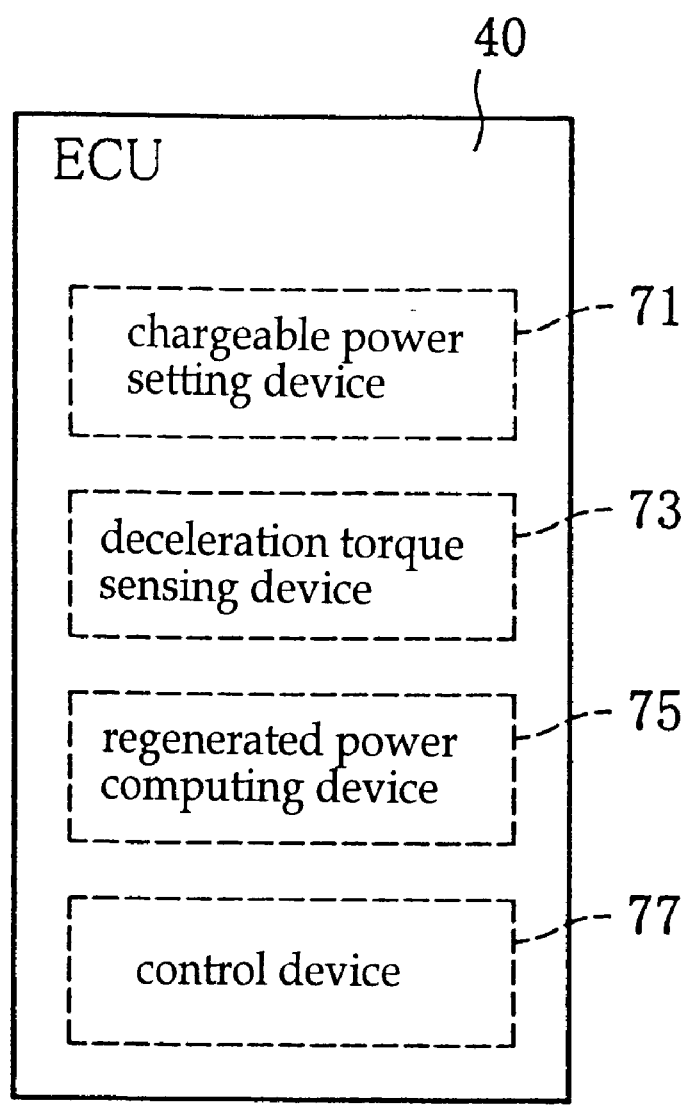
FIG. 2 is a block diagram showing the internal functions of an ECU.

As shown in FIG. 2, the ECU 40 has a chargeable power setting device 71 for setting chargeable power according to the charge level sensed by the battery controller 62, a deceleration torque sensing device 73 for sensing a deceleration torque required by a driver according to the output of the brake sensor 60 or the acceleration sensor 44, a regenerated power computing unit 75 for calculating regenerated power regenerated by the traction motor 60 according to the deceleration torque sensed by the deceleration torque sensing device 73 or the brake controller 54, and a control unit 77 of each device for controlling the entire system of the present invention.

According to the present embodiment, the accelerator pedal 43 or the brake pedal 58 functions as a deceleration instruction device. In the hybrid vehicle constructed in the above-mentioned manner, a required motor torque signal corresponding to the control input θacc of the accelerator pedal 50 is supplied to the inverter 14 while the vehicle is running. In accordance with the signal, the inverter 14 adjusts the voltage and the current from the battery 12, and therefore, the traction motor 10 generates a desired motor torque.

If the battery controller 46 senses a drop in the charge level (SOC) of the battery 12, the engine controller 48 starts the engine 24 to operate the generator 22, which generates power to charge the battery 12 in accordance with the SOC. If the SOC of the battery 12 is low, the power corresponding to the power consumption of the traction motor 10 is directly supplied from the generator 22 to the traction motor 10. The surplus power generated by the generator 22 is charged in the battery 12.

If, for example, a brake pedal (not shown) is operated to brake the vehicle and the control input θacc of the accelerator pedal 43 is 0, the traction motor 10 performs the regenerative braking and generates power. The regenerated power charges the battery 12. Alternatively, the regenerated power drives the generator 22 to forcibly operate the engine 24 without the supply of fuel and consume the regenerated power as an engine brake.

While the vehicle is running, the power from the battery 12 always runs the auxiliary motor 26 in order to drive the auxiliary units such as the air compressor 27 and the power steering pump 28. An operation of the regeneration control device of the hybrid vehicle according to the present invention will now be described.

Figure 3:
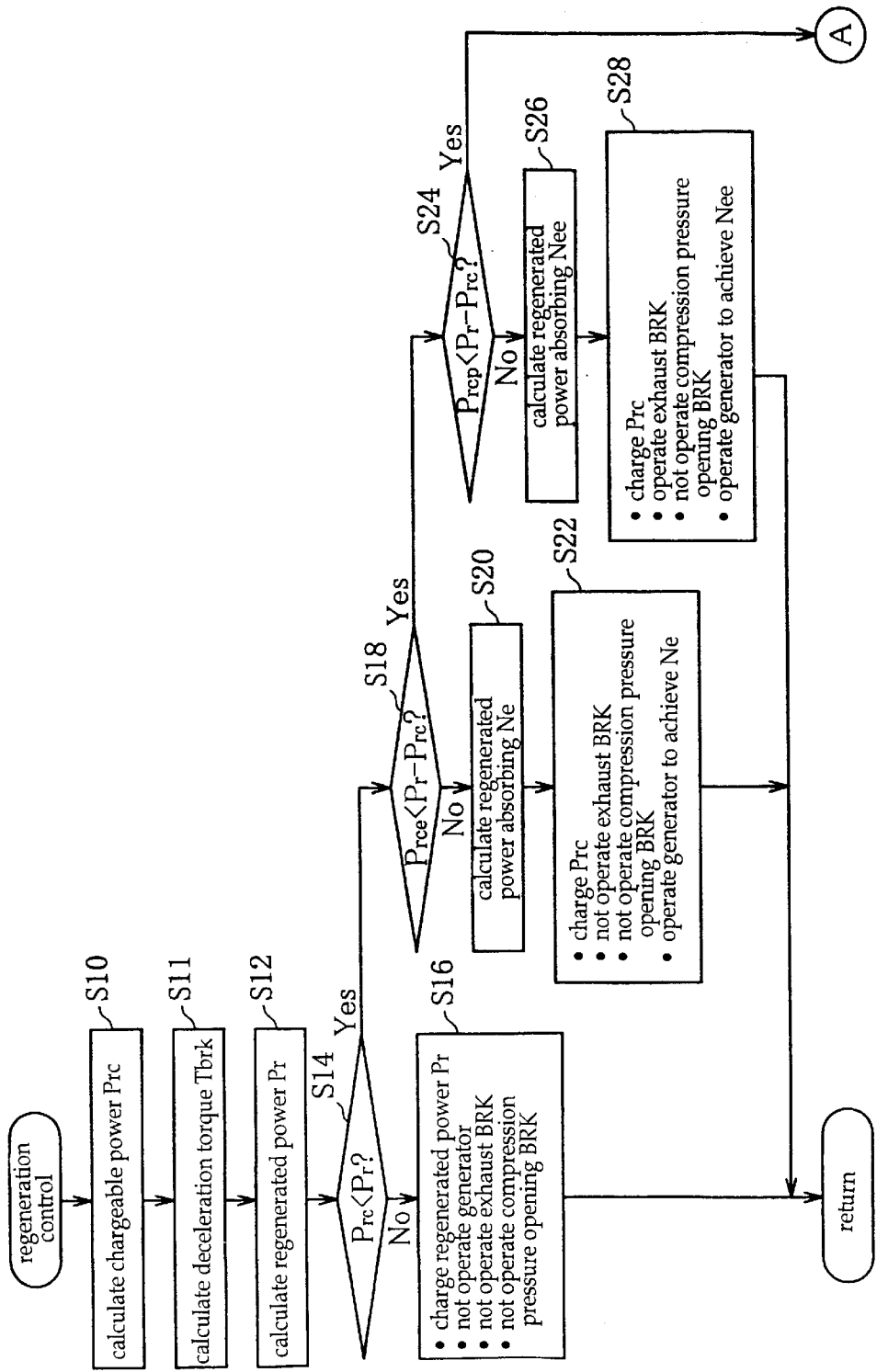
FIG. 3 is a flow chart showing a part of a regeneration control routine according to the present invention.
Figure 4:
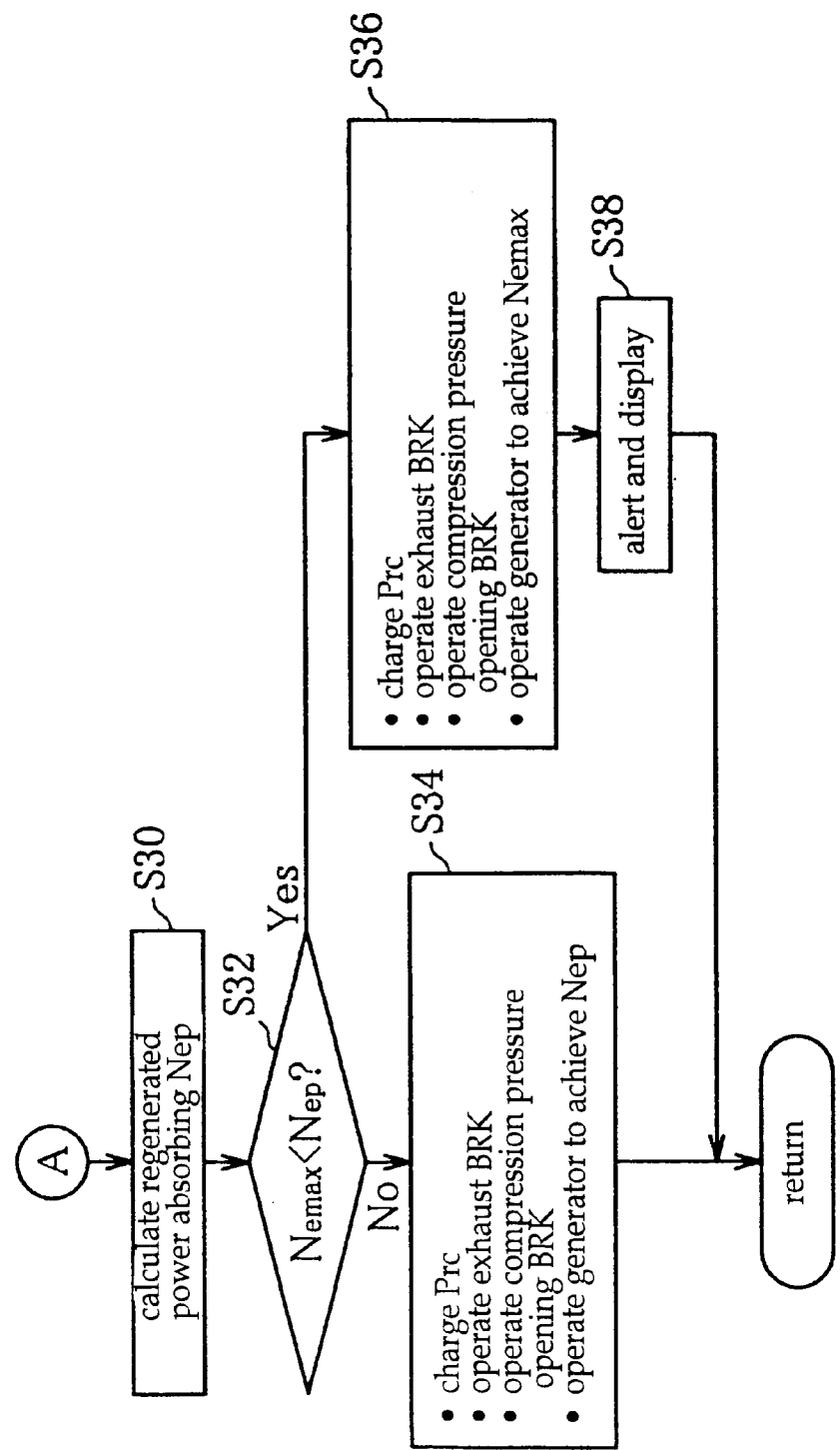
FIG. 4 is a flow chart showing the rest of the regeneration control routine continued from FIG. 3 according to the present invention.

FIGS. 3 and 4 are flow charts showing a regeneration control routine executed by the ECU 40 according to the present invention. The operation of the regeneration control device will be described with reference to the flow charts of FIGS. 3 and 4. In the control routine, step S10 is executed by the chargeable power setting device 71, step S11 is executed by the deceleration torque sensing device 73, step S12 is executed by the regenerated power computing unit 75, and step 14 and the succeeding steps are executed by the control devices 77.

In step S10, the chargeable power setting device senses the SOC of the battery 12 according to information from the battery controller 62, and computes the chargeable power of the battery 12 according to the value of the SOC. More specifically, the chargeable power Prc at the sensed charge level is computed from the product of a chargeable Isoc and the maximum voltage value Vmax peculiar to the battery according to the SOC of the battery 12. In this case, the chargeable power Prc is computed according to the following equation:

$$Prc = Vmax \cdot Isoc \{Isoc < Imax\} \quad (1)$$

Imax is the maximum current value that can be supplied to the battery 12, and the chargeable Isoc never exceeds the maximum current value Imax. In step S11, the deceleration torque Tbrk is computed according to the control input θacc of the accelerator pedal 43 sensed by the accelerator pedal depression sensor 44, the control input of the brake pedal 58 sensed by the brake sensor 60, and the like.

In step S12, the regenerated power Pr, which is actually regenerated by the traction motor 10, is computed from the product of the revolution speed Nmot of the traction motor 10 and the deceleration torque Tbrk computed in step S11. More specifically, the regenerated power Pr regenerated by the traction motor 10 during the braking is determined according to the deceleration requirement, i.e., the deceleration torque Tbrk corresponding to the control input of the brake pedal 58.

$$Pr = 2\pi Nmot \cdot Tbrk \cdot \eta \quad (2)$$

where η is the efficiency.

If the chargeable power Prc and the regenerated power Pr are found after the start of the regenerative braking, the process then goes to step S14. In step S14, the chargeable power Prc is compared with the regenerated power Pr to determine whether the regenerated power Pr is in excess of the chargeable power Prc (Prc<Pr). More specifically, whether the regenerated power Pr exceeds the chargeable power or not is determined by using the chargeable power Prc as a threshold level. The chargeable power Prc varies according to the charge level. The process goes to step S16 if the determination result is NO, i.e., the regenerated power Pr is not greater than the chargeable power Prc.

If the regenerated power Pr is not greater than the chargeable power Prc, the battery 12 is considered to have a sufficient charging capability. Therefore, in step S16, the whole regenerated power Pr is charged in the battery 12, and the generator 22 is not operated.

More specifically, it is unnecessary to run the engine brake while the battery 12 has a sufficient charge capability, and thus, the regenerated power is never supplied to the generator 22 in order to prevent the engine 24 from operating.

Since the engine 24 is not operated, the exhaust brake 24a and the compression pressure opening type brake 24b are not operated. On the other hand, the process goes to step S18 if the determination result in step S14 is YES, i.e., the regenerated power Pr is determined as being in excess of the chargeable power Prc. In step S18, it is determined whether a difference between the regenerated power Pr and the chargeable power Prc, i.e., the surplus regenerated power is in excess of a predetermined value (Prce<Pr−Prc). The predetermined value Prce means the maximum power that can be absorbed by the engine brake when the engine brake is obtained. The process goes to step S20 if the determination result is NO, i.e., the difference between the regenerated power Pr and the chargeable power is not greater than the predetermined value Prce.

In this case, it can be considered that the surplus regenerated power is sufficiently absorbed only by the engine brake. Thus, in step S20, the engine revolution speed Ne, which enables the absorption of the surplus regenerated power, is computed according to the difference between the regenerated power Pr and the chargeable power Prc.

In step S22, the exhaust brake 24a and the compression pressure opening type brake 24b are kept not operated since the surplus regenerated power can be sufficiently absorbed only by the engine brake as stated above. While the battery is charged with the chargeable power Prc, the generator 22 is driven by the motor to run the engine 24 at the engine revolution speed Ne without the supply of fuel so that the engine brake can consume the surplus regenerated power.

On the other hand, the process goes to step S24 if the determination result in step S18 is YES, i.e., the difference between the regenerated power Pr and the chargeable power Prc is larger than the predetermined value Prce. In step S24, it is determined whether the difference between the regenerated power Pr and the chargeable power Prc is larger than a predetermined value Prcp (Prcp<Pr−Prc). The predetermined value Prcp means the maximum power that can be absorbed by the engine brake and the exhaust brake 24a when the engine brake and the exhaust brake 24a as the auxiliary braking device are operated. The process goes to step S26 if the determination result in step S18 is NO, i.e. the difference between the regenerated power Pr and the chargeable power Prc is smaller than the predetermined value Prcp.

In this case, it can be considered that the surplus regenerated power is sufficiently absorbed by the engine brake and the exhaust brake 24a. Thus, in step S26, an engine revolution speed Nee, which enables the absorption of the surplus regenerated power by the engine brake and the exhaust brake 24a, is computed according to the difference between the regenerated power Pr and the chargeable power Prc.

In step S28, the exhaust brake 24a is operated but the compression pressure opening type brake 24b is not operated because the surplus regenerated power can be sufficiently absorbed only by the engine brake and the exhaust brake 24a as stated above. While the battery 12 is charged with the chargeable power Prc, the generator 22 is driven by the motor to run the engine 24 at the engine revolution speed Nee without the supply of fuel so that the engine brake and the exhaust brake 24a can consume the surplus regenerated power.

On the other hand, the process goes to step S30 if the determination result in step S24 is YES, i.e., the difference between the regenerated power Pr and the chargeable power Prc is larger than the predetermined value Prcp. In this case, it can be considered that the surplus regenerated power cannot be sufficiently absorbed only by the engine brake and the exhaust brake 24a.

Therefore, an engine revolution speed Nep, which enables the absorption of the surplus regenerated power by the engine brake, the exhaust brake 24a and the compression pressure opening type brake 24b, is computed according to the difference between the regenerated power Pr and the chargeable power Prc in step S30 as is the case with step S20. In the next step S32, it is determined whether the computed engine revolution speed Nep is larger than an allowable maximum revolution speed Nemax of the engine 24, because the engine revolution speed cannot exceed the allowable maximum revolution speed Nemax.

The process goes to step S34 if the determination result in step S32 is NO, i.e., the engine revolution speed Nep is not greater than the allowable maximum revolution speed Nemax and the engine can be run without any trouble. In step S34 the exhaust brake 24a and the compression pressure opening type brake 24b are operated and the battery 12 is charged with the chargeable power Prc, whereas the generator 22 is driven by the motor to run the engine 24 at the engine revolution speed Nep without the supply of fuel so that the engine brake, the exhaust brake 24a, and the compression pressure opening type brake 24b can consume the surplus regenerated power.

On the other hand, the process goes to step S36 if the determination result in step S32 is YES, i.e., the engine revolution speed Nep is in excess of the allowable maximum revolution speed Nemax. In step S34, the exhaust brake 24a and the compression pressure opening type brake 24b are operated as is the case with step S34. In this case, the battery 12 is charged with the chargeable power Prc while the generator 22 is driven by the motor to run the engine 24 at the engine revolution speed Nemax without the supply of fuel. In the next step S38, the display/alerting device 52 is instructed to alert and display the fact that the engine revolution speed Nep is in excess of the allowable maximum revolution speed Nemax. In this case, a service brake in a brake unit 56 is used together with the engine brake.

According to the present embodiment, the force of the engine brake is gradually changed according to whether the engine auxiliary brakes are operated or not operated, and is also adjusted by controlling the revolutions of the generator 22. It is therefore possible to follow the continuous change in the surplus regenerated power. Thus, the engine brake, the exhaust brake 24a, and the compression pressure opening type brake 24b can satisfactorily consume the necessary and sufficient regenerated power.

As stated above, the regeneration control device of the hybrid electric vehicle according to the present invention determines whether the battery 12 is charged with all the regenerated the power Pr or the surplus power Prc–Pr is consumed by driving the generator 22 by the motor. In this determination, the chargeable power Prc, which varies according to the charge level of the battery 12, is used as a threshold level. When the regenerated power Pr exceeds the chargeable power Prc, the surplus power Prc–Pr is consumed by operating the generator 22 by the motor.

Conventionally, if the charge level of the battery 12 is low, the chargeable power Prc is restricted by the maximum voltage value Vmax peculiar to the battery and the current value Isoc that can be supplied to the battery 12 even if there is a large chargeable capacity in view of the charge level. For this reason, when the regenerated power Pr is in excess of the chargeable power Prc, it is impossible to charge the surplus power Prc–Pr even if the battery 12 has an extra chargeable capacity. On the other hand, the regeneration control device of the present invention is able to satisfactorily consume the surplus power Prc–Pr by operating the generator 22 by the motor.

Therefore, the present invention enables the continuous regenerative braking to reduce the frequency of use of the service brake, and enables the efficient energy recovery while extending the life of the brake. According to the above embodiment, the accelerator pedal 43 or the brake pedal 58 is used as the deceleration instruction device, but the present invention should not be restricted to this. The ECU 40 may function as the deceleration instruction device if the present invention is applied to a vehicle with an automatic controlling function, e.g., a device that requires an automatic braking force according to a following distance.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A hybrid electric vehicle, comprising:
    a generator rotated by a driving force of an engine to thereby generate power;
    a battery to which the power generated by said generator is charged;
    a motor for generating a driving force to driving wheels of the vehicle by the power supplied from said battery and regenerating energy by using rotational power from the driving wheels to generate power and charge said battery when said vehicle is being braked;
    an actual charge level sensing device for sensing an actual charge level of said battery;
    a chargeable power setting device for setting chargeable power in accordance with a sensed value of the actual charge level of said battery by said actual charge level sensing device;
    a deceleration instruction device for instructing said vehicle to decelerate;
    a deceleration torque sensing device for sensing a deceleration torque required by said deceleration instruction device;
    a regenerated power computing unit for setting regenerated power to be regenerated by said motor during a regenerative braking according to a sensed value of the required deceleration torque by said deceleration torque sensing device; and
    a control device for supplying the power generated by said motor to said generator to thereby drive said generator to rotate said engine when an accelerator pedal for supplying fuel to the engine has not been depressed and when chargeable power set by said chargeable power setting device is less than the regenerated power computed by said regenerated power computing unit while said motor is regenerating the energy.

2. A hybrid electric vehicle according to claim 1, wherein:
    said engine has an auxiliary braking device for absorbing rotational energy from said engine, and
    said control device controls an operation of said auxiliary braking device according to a difference between said chargeable power and said regenerated power to thereby change a power consumption of said generator.

3. A hybrid electric vehicle according to claim 1, wherein:

said engine has an auxiliary braking device for absorbing rotational energy from said engine, and said control device determines revolutions, at which said engine is operated with the accelerator pedal not being depressed in, accordance with a difference between said chargeable power and said regenerated power, drives said generator to achieve the determined revolutions, and controls an operation of said auxiliary braking device to change a power consumption of said generator.

4. A hybrid electric vehicle according to claim 1, wherein:

said engine has a plurality of auxiliary braking devices for absorbing rotational energy from said engine; and said control device selects an operation of said plurality of auxiliary braking devices according to a difference between said chargeable power and said regenerated power.

5. A method of recharging a battery in a hybrid electric vehicle having a battery, a generator activated by a driving force of an engine to charge the battery, a motor activated by power from the battery and regenerates energy by using rotational power from driving wheels of the vehicle to generate power and charge the battery when the vehicle is being braked, comprising:

detecting an actual charge level of the battery;

setting chargeable power in accordance with the detected actual charge level of the battery;

instructing the vehicle to decelerate;

detecting a deceleration torque required in said instructing step;

setting regenerated power to be regenerated by the motor according to the detected deceleration torque; and supplying power generated by the motor to the generator to thereby drive the generator to run the engine without supplying fuel when the set chargeable power is less than the set regenerated power while the motor is regenerating the energy.

6. The method of claim 5, wherein said supplying step includes the step of controlling an operation of an auxiliary braking device, for absorbing rotational energy from said engine, according to a difference between said set chargeable power and said set regenerated power to thereby change a power consumption of the generator.

7. The method of claim 5, wherein said supplying step includes the steps of, determining revolutions, at which the engine is operated with the accelerator pedal not being depressed, in accordance with a difference between said set chargeable power and said set regenerated power, driving the generator to achieve the determined revolutions, and controlling an operation of an auxiliary braking device, for absorbing rotational energy from said engine, to change power consumption of the generator.

8. The method of claim 5, wherein said supplying step includes the step of selecting an operation of a plurality of auxiliary braking devices, for absorbing rotational energy from said engine, according to a difference between said set chargeable power and said set regenerated power.

* * * * *